(12) United States Patent
Martinsson et al.

(10) Patent No.: US 8,950,073 B2
(45) Date of Patent: Feb. 10, 2015

(54) CHAIN SHARPENING DEVICE

(75) Inventors: Pär Martinsson, Jönköping (SE);
Alexander Rashid Gawad, Brisbane (AU); Lucas Lund, Norrahammar (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 14/127,589

(22) PCT Filed: Jun. 23, 2011

(86) PCT No.: PCT/SE2011/050833
§ 371 (c)(1),
(2), (4) Date: Dec. 19, 2013

(87) PCT Pub. No.: WO2012/177199
PCT Pub. Date: Dec. 27, 2012

(65) Prior Publication Data
US 2014/0123499 A1    May 8, 2014

(51) Int. Cl.
*B23D 63/16* (2006.01)
*B27B 17/02* (2006.01)

(52) U.S. Cl.
CPC ............ *B23D 63/168* (2013.01); *B23D 63/166* (2013.01); *B27B 17/02* (2013.01)
USPC ............................................. 30/138; 76/80.5

(58) Field of Classification Search
None
See application file for complete search history.

(56) References Cited

U.S. PATENT DOCUMENTS

| | | | | |
|---|---|---|---|---|
| 3,147,644 A | * | 9/1964 | Oehrli | 76/37 |
| 3,361,012 A | * | 1/1968 | Fullerton | 76/80.5 |
| 3,465,617 A | | 9/1969 | Kay | |
| 3,487,591 A | * | 1/1970 | Silvon | 451/439 |
| 3,512,631 A | * | 5/1970 | Braun et al. | 206/349 |
| 3,526,156 A | * | 9/1970 | Krabbe et al. | 76/80.5 |
| 3,529,495 A | * | 9/1970 | Graversen | 76/80.5 |

(Continued)

FOREIGN PATENT DOCUMENTS

WO    WO 2012/122061 A2 * 9/2012
WO    WO 2013/117015 A1 * 8/2013

OTHER PUBLICATIONS

International Search Report and Written Opinion of PCT/SE2011/050833 mailed Jan. 3, 2012.

(Continued)

*Primary Examiner* — Hwei C Payer
(74) *Attorney, Agent, or Firm* — Nelson Mullins Riley & Scarborough, LLP (57) ABSTRACT

A chain sharpening device arranged to sharpen a saw chain. The device comprises a housing (110), arranged to be detachably mounted on the guide bar (3), a sharpening element (140) selectively displaceable relative to the housing between a resting state and a sharpening state, an actuator (150), selectively displaceable between an inactivated state and an activated state, which actuator is connected to the sharpening element and arranged to selectively bring the sharpening element from the resting state to the sharpening state, a first biasing member (160) operatively connected to the actuator and arranged to bias the actuator towards its inactivated state, a second biasing member (170), operatively connected to the sharpening element and arranged to enable relative movement between the actuator and the sharpening element when the sharpening element is in the sharpening state, so as to delimit a force with which the sharpening element (140) can be pressed towards the saw chain.

14 Claims, 7 Drawing Sheets

(56) References Cited

U.S. PATENT DOCUMENTS

| | | | |
|---|---|---|---|
| 3,534,638 A | * | 10/1970 | Ourkerk .................... 76/80.5 |
| 3,921,490 A | * | 11/1975 | Dolata et al. ................ 83/833 |
| 4,385,532 A | | 5/1983 | Dolata et al. |
| 4,530,258 A | | 7/1985 | Gibson et al. |
| 4,597,178 A | * | 7/1986 | Dolata et al. ................ 30/138 |
| 6,006,629 A | * | 12/1999 | Lofgren .................... 76/80.5 |
| 6,058,806 A | | 5/2000 | Ford |
| 8,746,118 B2 | * | 6/2014 | Seigneur et al. ............. 83/788 |
| 2011/0030223 A1 | * | 2/2011 | Seigneur et al. ............. 30/138 |

OTHER PUBLICATIONS

Chapter I International Preliminary Report on Patentability of PCT/SE2011/050833 mailed Dec. 23, 2013.

\* cited by examiner

CHAIN SHARPENING DEVICE

TECHNICAL FIELD

The present invention relates to the field of chain saws, and more specifically, to guide bar mounted chain sharpening devices for chain saws.

BACKGROUND OF THE INVENTION

Chain sharpening arrangements for chain saws are well known in the art. Saw chain links need to be periodically sharpened to maintain efficiency in a cutting operation.

US20110030223 discloses a sharpening fixture adapted to mount to the nose of a chainsaw guide bar. When mounted, the operator may direct a force towards the guide bar thereby causing a linear directed actuator to move a sharpening element into engagement with cutters of a saw chain to sharpen a cutting edge of the cutters.

U.S. Pat. No. 4,597,178 discloses a saw chain sharpener integrated in an elongated chain guard casing for removably receiving the guide bar therein.

SUMMARY OF THE INVENTION

However, there is a need for an improved chain sharpening device.

It is an object of the present invention to provide an improved chain sharpening device, which is enables a simple and safe chain sharpening operation. The device shall be easy to use, and arranged so as to prevent premature wear of the chain and the sharpening element. The device shall be possible to manufacture in a cost-efficient way.

According to a first aspect of the solution, at least one of these objects is achieved by a chain sharpening device according to the present invention. The chain sharpening device arranged to sharpen a saw chain moving along the periphery of a guide bar of a chainsaw. The chain sharpening device comprises a housing, arranged to be detachably mounted on the guide bar such that it encloses a portion of the guide bar and a portion of the saw chain. It also comprises a sharpening element comprising a grinding portion, which sharpening element is at least partially received within the housing. The sharpening element is selectively displaceable relative to the housing between a resting state and a sharpening state, such that, when the housing is mounted on the guide bar, around the periphery of which the chain is arranged, the grinding portion abuts on a portion of the saw chain in the sharpening state, and, the grinding portion is spaced away from the saw chain in the resting state. The chain sharpening device also comprises an actuator, selectively displaceable between an inactivated state and an activated state, which actuator is connected to the sharpening element and arranged to selectively bring the sharpening element from the resting state to the sharpening state. The chain sharpening device also comprises a first biasing member operatively connected to the actuator and arranged to bias the actuator towards its inactivated state. The chain sharpening device furthermore comprises a second biasing member, operatively connected to the sharpening element and arranged to enable relative movement between the actuator and the sharpening element when the sharpening element is in the sharpening state, so as to delimit a force with which the sharpening element can be pressed towards the saw chain. Thereby, a chain sharpening device which is easy to use is achieved, since the force with which the sharpening element is pressed towards the chain is limited even if an operator exerts an unnecessarily large force on the actuator.

According to an embodiment, the second biasing member is arranged to bias the sharpening element towards the activated state. Thereby, a force with which the grinding element is pressed towards the chain may be well defined and chosen by means of selecting an appropriate spring force of the second biasing member.

According to another embodiment, the sharpening device comprises a support arrangement preventing the sharpening element from moving towards the sharpening state as long as the actuator is not moving towards the activated state. Thereby the grinding element is prevented from bearing against the chain when the actuator is in its resting state.

According to another embodiment, the sharpening element is pivotably connected to the housing so as to be rotatable about a first pivot axis. Thereby a robust solution is achieved.

According to another embodiment, the actuator is pivotably connected to the housing so as to be rotatable about a second pivot axis. Thereby a compact solution can be achieved.

According to another embodiment, the first and second pivot axes are equal. Thereby, an arrangement is provided for which a number of parts is delimited, and a simple arrangement is achieved which can be produced at a low cost.

According to another embodiment, the actuator is arranged at an angle to a longitudinal direction of the housing. Thereby, an arrangement which is ergonomic is achieved.

According to another embodiment, a spring force of the first biasing member is greater than a spring force of the second biasing member.

According to a second aspect of the solution a chain sharpening device is provided which chain sharpening device arranged to sharpen a saw chain moving along a periphery of a guide bar of a chainsaw. The chain sharpening device comprises a housing, arranged to be detachably mounted on the guide bar such that it encloses a portion of the guide bar and a portion of the saw chain. It also comprises a sharpening element comprising a grinding portion. The sharpening element is at least partially received within the housing, and is selectively displaceable relative to the housing between a resting state and a sharpening state. When the housing is mounted on the guide bar, around the periphery of which the chain is arranged, the grinding portion abuts on a portion of the saw chain in the sharpening state, whereas the grinding portion is spaced away from the saw chain in the resting state. The chain sharpening device also comprises an actuator, selectively displaceable between an inactivated state and an activated state, which actuator is rigidly connected to the sharpening element and arranged to selectively bring the sharpening element from the resting state to the sharpening state. The chain sharpening device also comprises a first biasing member operatively connected to the actuator and arranged to bias the actuator towards its inactivated state. The actuator is pivotably connected to the housing so as to be rotatable about a pivot axis PA. Thereby an ergonomically favourable arrangement is achieved.

According to an embodiment, the housing is arranged to substantially cover the whole portion of the guide bar extending beyond a body portion of the chain saw. Thereby, sparks arising during chain sharpening are prevented from spreading in an uncontrolled way.

According to an embodiment of the first and second aspects, the sharpening element is arranged to engage the chain substantially at a nose portion of the guide bar. Thereby, sharpening can be performed on an outer circumference of the chain.

According to an embodiment of the second aspect, the chain sharpening device comprises an indicator arranged to indicate when the actuator is subjected to an appropriate external pressure.

According to an embodiment of the first and second aspects, the chain sharpening device comprises a lock arrangement, ensuring that the sharpening element can reach its activated state only when the housing is securely connected to the guide bar. Thereby an arrangement which is even more safe and easy to use is achieved According to a third aspect of the solution a guide bar the first or second aspects is provided. The same advantages as for the first and second aspects apply to the third aspect.

According to a fourth aspect, a chainsaw provided with the chain sharpening device according to the first or second aspect is provided. The same advantages as for the first and second aspects apply to the fourth aspect.

Definitions

As used herein the following terms have the following meanings:

The terms "front" and "rear" are used as seen from a chain saw operator's point of view. The terms "upwards" and "downwards" are defined based on a support surface on which the chain saw might be positioned.

BRIEF DESCRIPTION OF THE DRAWINGS

Embodiments will be understood and appreciated more fully from the following detailed description, taken in conjunction with the drawings, in which.

DESCRIPTION OF PREFERRED EMBODIMENTS

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

Figure 1:
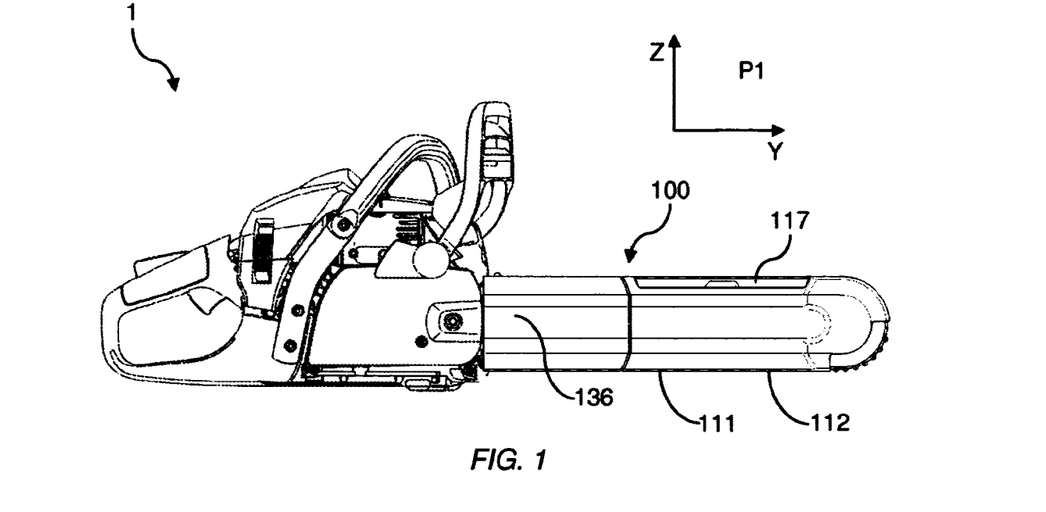
FIG. 1 is a side view of a chain saw provided with a chain sharpening device according to embodiments herein.

Referring to FIG. 1, a chain sharpening device 100 connected to a guide bar 3 of a chain saw 1 is illustrated, in accordance with various embodiments. A saw chain 4 (see e.g. FIG. 2b) is supported in a peripheral groove (not shown) which extends around the guide bar 3.

The saw chain may be in drivable engagement with a sprocket drive wheel fixed to a sprocket drive shaft which is drivably connected to a motor arranged within the body portion of the chain saw 1. In this way, the motor may drive the chain 4 around the periphery of the guide bar 3 during operation of the chain saw 1.

The saw chain 4 may include different links, such as cutting links 41 configured to cut an amount of material. A top surface 42 of a link faces away from the guide bar 3 when the saw chain 4 is arranged on the guide bar 3.

Guide Bar

The guide bar 3 on which the chain sharpening device 100 is arranged to be mounted has a longitudinal direction, as indicated by the Y-direction in FIG. 1. The guide bar extends from a rear end to a front end 32 in the longitudinal direction. The portion adjacent to the front end 32 of the guide bar defines a nose portion 33 of the guide bar 3.

The vertical direction of the guide bar is defined by the Z-direction in FIG. 1. A main extension plane P1 of the guide bar 3 is defined by the YZ-plane as shown in FIG. 1.

Chain Sharpening Device 100

In FIGS. 2a to 2f, a chain sharpening device 100 according to a first embodiment of the present invention is shown.

Housing

Figure 2A:
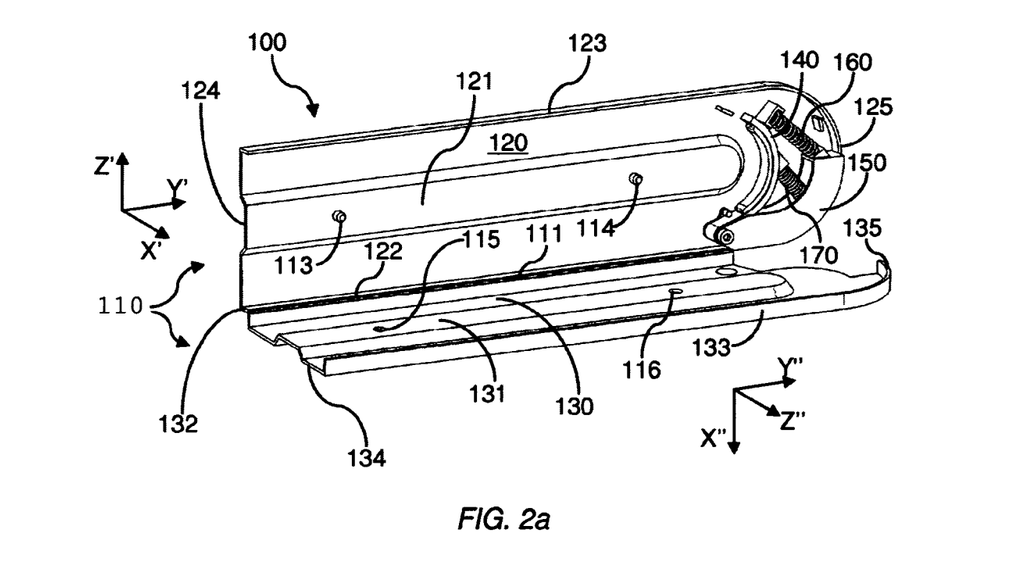
FIG. 2a is a perspective view of a chain sharpening device according to a first embodiment, in an open state.

The chain sharpening device 100 comprises a housing 110. According to various embodiments the housing 110 is configured as a two part pocket, with a first half-shell 120 and a second half-shell 130.

As shown e.g. in FIG. 1, the housing 110 can be configured so as to extend along a major part of the guide bar 3, when the chain sharpening arrangement is mounted on the guide bar. According to the embodiment shown in FIG. 1, the housing 110 covers essentially the entire portion of the guide bar extending in front of the body portion of the chain saw 1.

First Half-Shell

The first half-shell 120 has a length defined in a longitudinal direction. The longitudinal direction of the half-shell is indicated by the Y'-direction in FIG. 2a. (When the half-shell is connected to the guide bar 3, the longitudinal direction Y' of the half-shell is equal to the longitudinal direction Y of the guide bar 3.)

The first half-shell 120 has a height defined in a vertical direction. The vertical direction of the first half-shell 120 is indicated by the Z'-direction in FIG. 2a. (When the half-shell is connected to the guide bar 3, the vertical direction of the half-shell Z' is equal to the vertical direction Z of the guide bar 3.)

Figure 2B:
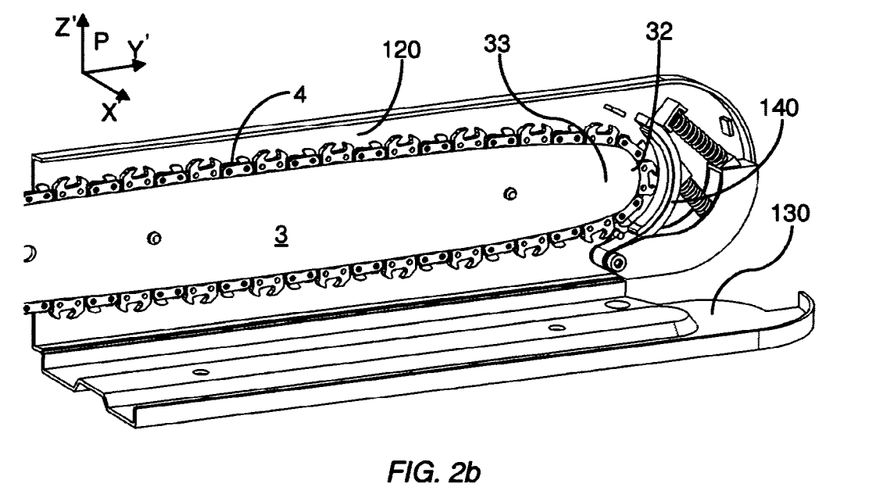
FIG. 2b is a perspective view of an arrangement comprising a chain saw guide bar with a saw chain and the chain sharpening device of FIG. 2a, in a partly assembled, but still open, state.
Figure 2C:
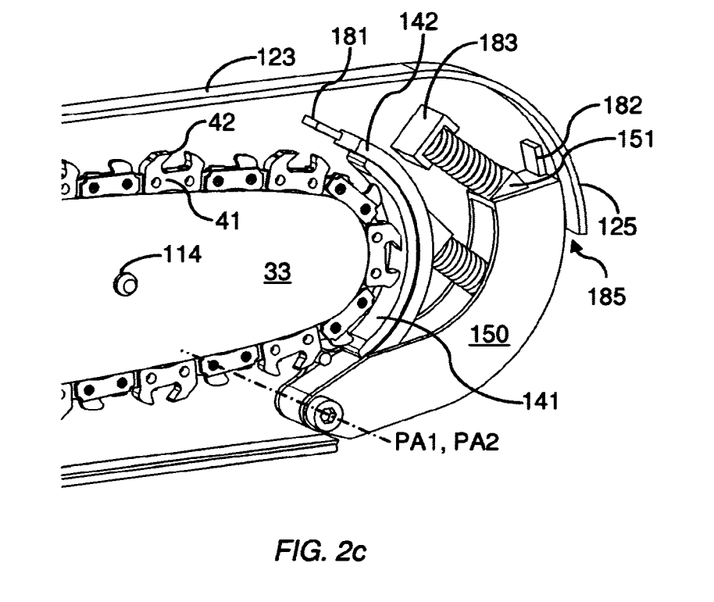
FIG. 2c is a perspective detail view of a portion of the arrangement of FIG. 2b.
Figure 2D:
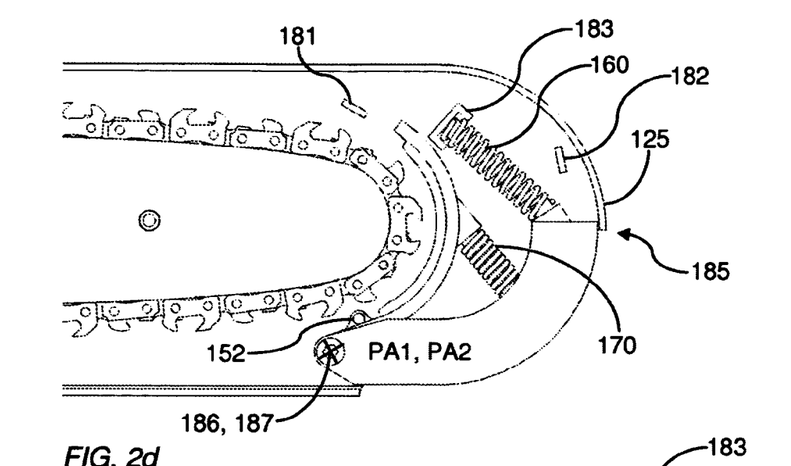
FIG. 2d is a side view of the portion of FIG. 2c.

The main extension plane P of the first half-shell is defined by the Y'- and Z'-directions, as shown in FIG. 2b.

The first half-shell 120 has an inner surface 121 arranged to face toward the guide bar 3 and an outer surface (not shown) arranged to face away from the guide bar 3, when the chain sharpening device 100 is mounted on the guide bar 3. The inner surface 121 may be provided with ribs (not shown).

Moreover, the first half-shell 120 has a lower edge 122, an upper edge 123, a rear edge 124 and a front edge 125.

The width of the first half-shell is defined in a lateral direction, indicated by the X'-direction in FIG. 2a.

Second Half-Shell

Correspondingly, the second half-shell 130 has a length defined in a longitudinal direction. The longitudinal direction of the half-shell is indicated by the Y"-direction in FIG. 2a. (When the half-shell is connected to the guide bar 3, the longitudinal direction of the half-shell Y" is equal to the longitudinal direction Y of the guide bar 3.

The second half-shell 130 has a height defined in a vertical direction. The vertical direction of the second half-shell 130 is indicated by the Z"-direction in FIG. 2a. (When the half-shell is connected to the guide bar 3, the vertical direction of the half-shell Z" is equal to the vertical direction Z of the guide bar 3.)

The second half-shell 130 has an inner surface 131 arranged to face toward the guide bar 3 and an outer surface 136 arranged to face away from the guide bar 3, when the chain sharpening device 100 is mounted on the guide bar 3. The inner surface 131 may be provided with ribs (not shown).

Moreover, the second half-shell 130 has a lower edge 132, an upper edge 133, a rear edge 134 and a front edge 135.

The width of the second half-shell is defined in a lateral direction, indicated by the X"-direction in FIG. 2a.

Hinge

The lower edge 122 of the first half-shell 120 may be hingedly connected to the lower edge 132 of the second half-shell 130 by means of a hinge arrangement 111, arranged along the lower edges 122, 132. When the housing 110 is closed, a lower edge 112 of the housing is defined by the lower edges 122, 132 of the two half-shells 120, 130.

In FIGS. 2a and 2b, a chain sharpening device 100 according to an embodiment is shown with the housing 110 in an open position.

According to the embodiments shown herein, the active parts (the parts participating in the chain sharpening) of the chain sharpening device 100 are operatively connected to the first half-shell 120. In this case, the second half-shell 130 functions as a looking and protecting cover. Of course, other configurations are also possible.

The active parts can be accommodated in a space defined in a front portion of the first half-shell 120.

Fixing and Aligning

In order to enable a secure connection of the chain sharpening device to the guide bar, an aligning and fixing arrangement may be provided.

According to the embodiments herein, the aligning and fixing arrangement comprises two pins 113, 114, protruding from the inner surface 121 of the first half-shell 120, in the lateral direction X' of the first half shell. The pins 113, 114 are arranged to be received in, and pass through, corresponding openings arranged in the guide bar. There might also be corresponding recesses 115, 116 defined in the inner surface 131 of the second half-shell 130. These recesses 115, 116 are arranged to accommodate the free end of the pins 113, 114 when the chain sharpening device 100 is mounted on the guide bar 3, and the housing 110 is closed.

In order to lock the second half-shell to the first half-shell, a flipable part 117 can be arranged along a portion of the upper edges 123, 133 of the first half-shell 120 and the second half-shell 130. The flipable part 117 can be hingedly connected to either of the half-shells, and may lock the half shells together in a snap fit manner.

According to the configuration described above, no separate tools are required for mounting of the chain sharpening device 100 on the guide bar. Moreover, the chain sharpening device 100 is easily mounted in the correct position.

Furthermore, the snap fit connection between the two shells 120, 130 of the housing 110 provides an arrangement which is easy to open and remove when the operator wishes to.

Sharpening Mechanism

The sharpening mechanism of the chain sharpening device 100 comprises the "active parts" of the chain sharpening device, such as a sharpening element 140 and an actuator 150.

Sharpening Element 140

According to various embodiments, the sharpening element 140 comprises a grinding portion 141 and a holder portion 142.

Grinding Portion 141

The grinding portion 141 can be made of a variety of materials, suitable for saw chain sharpening. According to the embodiments herein, the grinding portion 141 is arcuate, so as to be able to engage with, and sharpen, links of the chain 4 as the chain 4 traverses the nose portion 33 of the guide bar.

The grinding portion 141 may be detachably or fixedly connected to the holder portion 142. It may also be formed integrally with the holder portion 142.

When the chain sharpening device 100 is activated by an operator of the chain saw 1, the grinding portion 141 is pressed against the chain so that various links of the chain may be sharpened as the chain is driven such that the links pass by the grinding portion 141. The grinding portion 141 will abut on top surfaces 42 of the links, i.e. surfaces facing away from the guide bar 3.

Holder Portion 142

The holder portion 142 is arranged to hold the grinding portion 141. The holder portion 142 may also be formed integrally with the grinding portion 141. According to some embodiments, the sharpening element 140 is configured such that the grinding portion is replaceable whereas the holder portion is a more permanent part of the chain sharpening device 100.

According to embodiments herein, the sharpening element 140 is movable between a resting state and a sharpening state. When the sharpening element 140 is in the sharpening state, it has a position in which the grinding portion 141 is within the cutting radius of the saw chain as the chain 4 passes by the grinding portion 141. According to some embodiments, the grinding portion abuts on the chain as it traverses the nose portion 33 of the guide bar 3.

A stop 181 might be arranged in the housing so as to delimit the movement of the sharpening element towards the chain. Such a stop might be useful in order to prevent the engagement between the chain and the holder portion in case the operator continues the sharpening procedure although the grinding portion is worn out.

The sharpening element is in the resting state when the actuator is in its inactivated state. The different positions/states of the actuator are further described below.

According to the embodiment shown in FIGS. 2a-2f, the holder portion is connected to the housing by means of a shaft 186 extending in a lateral direction X', from the inner surface of the first half-shell 120. The holder portion 142 is pivotable about the axis PA1 defined by this shaft 186, i.e. in a plane that is parallel to a main extension plane P of the first half-shell (and thereby parallel to the main extension plane P1 of the guide bar when the chain sharpening device 100 is mounted on the guide bar). The sharpening element will thus move between its resting state and its sharpening state along a curved path.

According to other embodiments, the sharpening element is arranged to move linearly between the sharpening state and the resting state.

Actuator

In order to initiate movement of the sharpening element an operator of the chain saw 1 applies a pressure to an actuator 150 which is operatively connected to the sharpening element 140. The operator might apply the needed pressure to the actuator by pressing the chainsaw (with a chain sharpening device 100 arranged on the guide bar 3) such that the actuator 150 is pressed towards an object (such as a stub) or towards the ground.

According to various embodiments, the actuator is captively connected to the housing 110.

The actuator 150 might be shaped to fit into a recess in the housing 110, as shown in the embodiments herein, or with a portion extending beyond the periphery of the housing.

According to some embodiments herein, the actuator is positioned at an angle to the longitudinal direction Y of the guide bar 3 when the sharpening device is mounted on the guide bar. Such a configuration minimizes the effort from the user and diminishes the risk of sliding of the ground or when pressing the actuator against an object such as a log or a stub.

According to some embodiments the actuator is arranged such that a force applied to the actuator is applied at an angle of 15-120° relative to the longitudinal direction Y of the guide bar.

According to the embodiment shown in FIGS. 2a-2f, the actuator 150 is connected to the housing by means of a shaft 187 extending in a lateral direction, from the inner surface of the first half-shell. The actuator is pivotable about the axis PA2 defined by this shaft, i.e. in a plane that is parallel to a main extension plane P of the first half-shell (and thereby parallel to the main extension plane P1 of the guide bar when the chain sharpening device 100 is mounted on the guide bar). The actuator will thus move between its inactivated state and its activated state along a curved path.

According to the embodiment shown in FIGS. 2a- 2f, the same shaft is used for the actuator as for the sharpening element, such that the actuator and the sharpening element are pivotable about one common pivot axis PA.

According to other embodiments, the actuator is arranged to move linearly between the sharpening state and the resting state.

The actuator is selectively movable between an activated state and an inactivated state.

A stop 182 can be provided in the housing so as to delimit the movement of the actuator from the inactivated state to the activated state. In FIG. 2f, the actuator abuts on the stop. A stop 185 might also be provided so as to delimit the movement of the actuator from the activated state to the inactivated state. In the embodiment shown in FIGS. 2a-2f, the front edge 125 of the housing (first half shell) is arranged to overlap slightly with the actuator, so as to define a stop 185.

First Biasing Member

According to various embodiments herein, the actuator is biased towards an inactivated state by means of a first biasing member 160.

The first biasing member 160 can be realized in various ways. In the embodiments shown herein, the biasing member is a compression spring 160. However, any suitable kind of spring can be used, such as a torsion spring, a leaf spring, an extension spring, a plate spring, a rubber spring, a torsion shaft or the like.

According to various embodiments, the first biasing member is operatively connected to the actuator and to a force receiving member 183 arranged in the housing.

In the exemplary embodiments shown in the figures, the first biasing member is a compression spring which is squeezed between the force receiving member 183 of the housing 110, and a spring receiving surface 151 defined by the actuator 150.

According to other embodiments, the first biasing member 150 is a helical torsion spring. The coil of the torsion spring can be wound around a shaft extending perpendicularly to the main extension plane of the housing whereas the legs of the spring brace against the housing and the actuator respectively.

The force receiving member 183 is connected to the housing. In the embodiments shown in the drawings, the force receiving member is realized as a boss 183 protruding from the inner surface 121 of first half-shell 120.

Connection between Sharpening Element and Actuator

The sharpening element 140 is constructed so as to follow the movement of the actuator 150, at least as long as the sharpening element 140 is not in contact with the chain.

Figure 4:
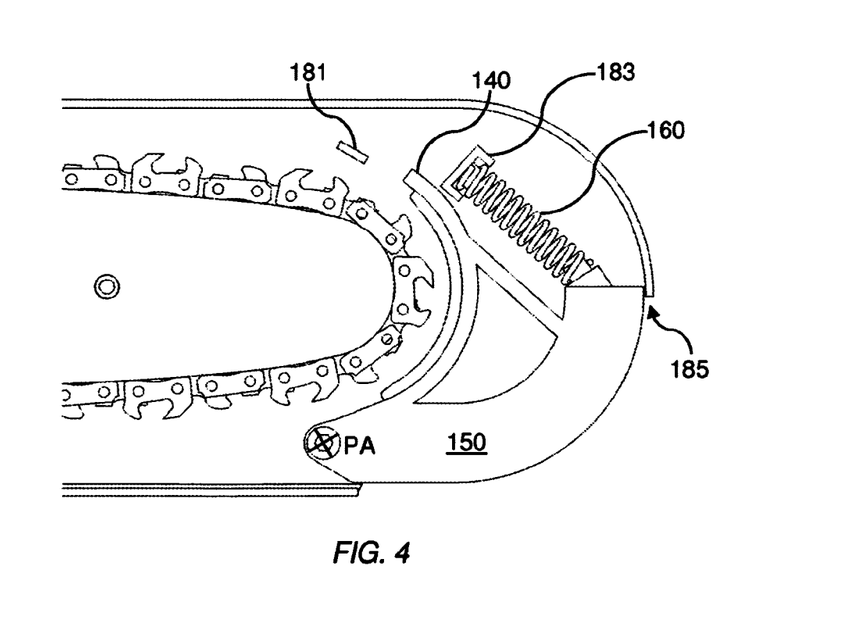
FIG. 4 is a side view of a portion of a chain sharpening device according to a third embodiment.

According to the embodiment shown in FIG. 4, the actuator 150 and the holder portion 142 of the sharpening element 140 are integrally formed, such that a rigid connection between the sharpening element and the actuator is achieved. According to that embodiment, the sharpening element will always follow the movement of the actuator.

According to other embodiments herein, a second biasing member 170 is connected to the sharpening element 140, so as to bias the sharpening element towards the sharpening state. (The biasing force of the second biasing member 170 is thus directed oppositely to the biasing force of the first biasing member 160.) However there is a support arrangement 152 preventing the sharpening element 140 from moving towards the sharpening state as long as the actuator 150 is not moving towards the activated state. In the embodiment shown in FIGS. 2a-2f, this arrangement is realized by means of a boss 152 provided on the actuator 150. The boss 152 is arranged to abut on the holder portion 142 of the sharpening element so as to guide the sharpening element and to delimit movement of the sharpening element towards the sharpening state.

When the operator presses the actuator 150 with a force exceeding the spring force of the first biasing member 160, the actuator 150 will move towards the activated state. Since the sharpening element 140 is biased towards the sharpening state, it will follow the movement as long as there is no force acting on the sharpening element 140 in the opposite direction (see below).

When the pressure on the actuator is released such that the force exerted on the actuator is lower than the spring force of the first biasing member, the actuator will revert towards the inactivated state, and the boss 152 will force the sharpening member to follow.

Second Biasing Member 170

According to various embodiments herein, the chain sharpening device comprises a second biasing member 170, which is arranged to enable relative movement between the actuator 150 and the sharpening element 140.

Similarly to the first biasing member 160, the second biasing member 170 can be realized in various ways. Not only compressions springs, but also other kind of springs can be used, such as a torsion spring, a leaf spring, an extension spring, a plate spring, a rubber spring, a torsion shaft or the like.

In the embodiment shown in FIGS. 2a-2f, the second biasing member is a compression spring 170 which is clamped between the sharpening element 140 and the actuator 150.

According to other embodiments, the second biasing member is clamped between the sharpening element 140 and a force receiving member 184 provided in the housing. The force receiving member 184 might be realized by means of a boss 184 protruding from the inner surface 121 of first half-shell 120.

The second biasing member 170 can also be a helical torsion spring. The coil of the torsion spring can be wound around a shaft extending perpendicularly to the main extension plane of the housing whereas the legs of the spring brace against the housing and the actuator respectively.

According to one embodiment the coil of the torsion spring is wound around the shaft defining the pivot axis PA1 of the sharpening element.

The purpose of the second biasing member is to limit the force with which the sharpening element is pressed towards the chain when the sharpening element is in the sharpening state.

When the actuator is pressed and the sharpening element is in the sharpening state, the second biasing member will become loaded, and the support arrangement 152 will temporarily disengage from the sharpening element. In this way, the actuator might move towards an activated state, although the sharpening element does not move relative to the guide bar and the chain. Accordingly, the second biasing member ensures that the force with which the sharpening element is pressed towards the chain is limited.

When an operator presses the actuator towards the ground, he or she might use an unnecessarily strong force, such that the actuator is pressed until it reaches the stop 182. If the sharpening element and the actuator are rigidly interconnected, this might imply that the grinding portion of the sharpening element is worn out more quickly than what is necessary, since the pressure with which the grinding portion is pressed towards the chain is directly dependent on the pressure exerted on the actuator in this case. Moreover, the chain might get worn out more quickly than what is necessary, if the sharpening element and the actuator are rigidly interconnected.

When a second biasing member 170 is present in the chain sharpening device, as described above, the force with which the grinding portion is pressed can be limited even if the actuator is pressed such that it reaches the stop 182. Accordingly, the grinding portion might be used for a longer time before being worn out, even if the operator uses an unnecessarily high force when sharpening the chain.

Figure 2E:
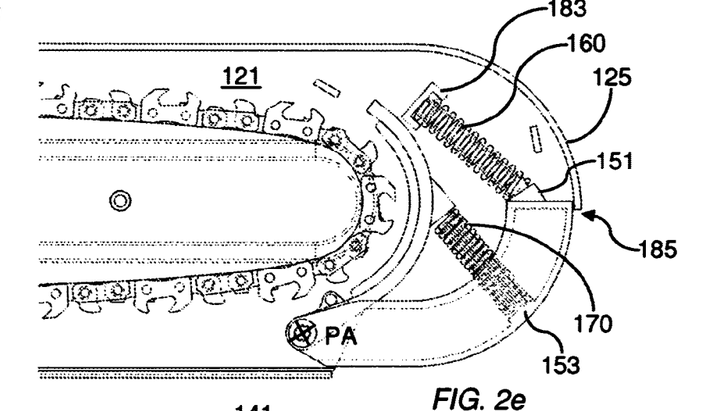
FIG. 2e is a partly transparent side view corresponding to the one of FIG. 2d.
Figure 2F:
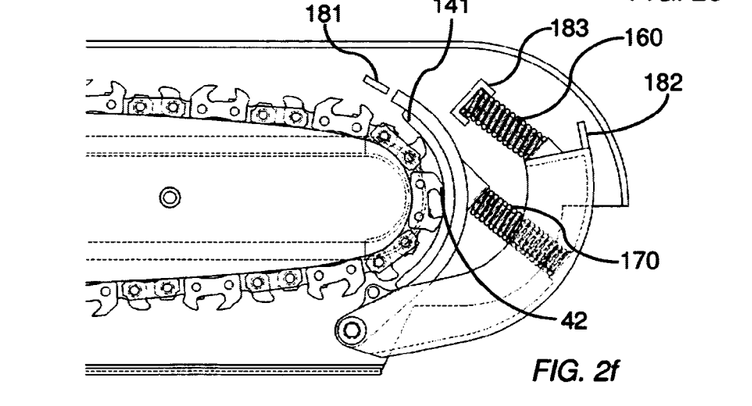
FIG. 2f is a side view corresponding to FIG. 2e, in which the chain sharpening device is in an activated state.

In the embodiment shown in FIGS. 2a-2f, the second biasing member braces against a biasing member receiving portion 153 of the actuator 150 and the holder portion 142 of the sharpening element 140 (see FIG. 2e). When the second biasing member is arranged in this way, between the sharpening element and the actuator, the spring forces of the first and second biasing members may be chosen independently of each other.

FIG. 3

Figure 3:
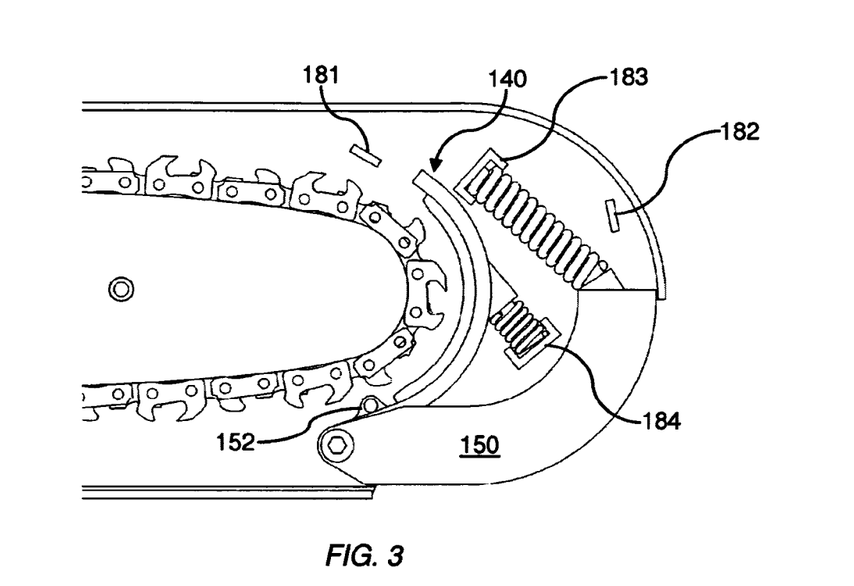
FIG. 3 is a side view of a portion of a chain sharpening device according to a second embodiment.

The embodiment shown in FIG. 3 differs from the one in FIGS. 2a to 2f in that the second biasing member 170 braces against the housing instead of the actuator. In all other matters the embodiment shown in FIG. 3 is equal to the embodiment shown in FIGS. 2a-2f.

When the second biasing member 170 is operatively connected to the housing and to the sharpening element, the spring force of the second biasing member needs to be smaller than the spring force of the first biasing member 160. As long as the spring force of the first biasing member 160 is at least as large as the spring force of the second biasing member 170, the actuator will bear against the stop 185 when the actuator is not exposed to an external force. If spring force of the second biasing member is larger than the first biasing member, the second biasing member would force the actuator towards the chain (in a counter clockwise direction of FIG. 3) even if the the actuator is not exposed to an external force.

Figures 5A, 5B:
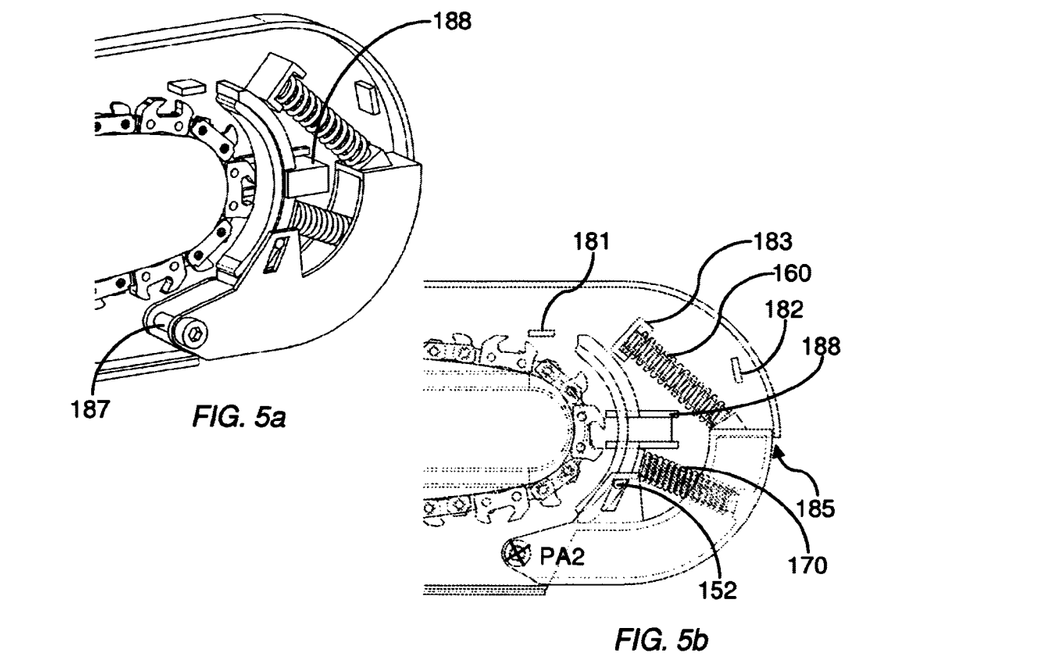
FIG. 5a is a perspective view of a portion of a chain sharpening device according to a fourth embodiment.
FIG. 5b is a partly transparent side view of the fourth embodiment.

FIGS. 5a and 5b

In the embodiment shown in FIGS. 5a and 5b, the sharpening element is arranged to move linearly between the resting state and the sharpening state. Guides 188 might be formed in housing so as to guide the movement of the sharpening element.

According to the embodiment shown in FIGS. 5a and 5b, the support arrangement 152 comprises a boss 152 extending from the sharpening element. The boss is slidable in a groove defined in the actuator.

FIG. 6

Figure 6:
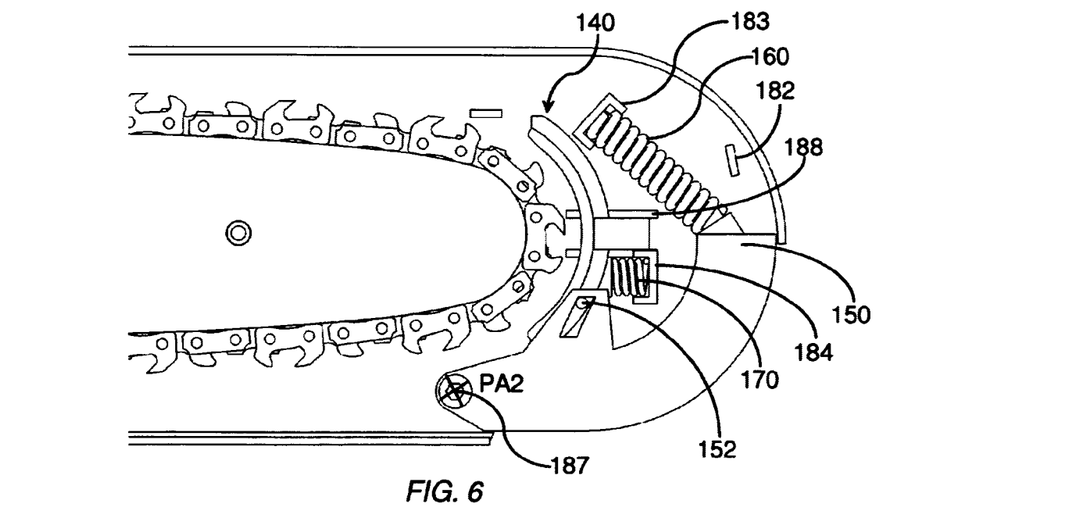
FIG. 6 is a side view of a portion of a chain sharpening device according to a fifth embodiment.

The embodiment shown in FIG. 6 corresponds to the one shown in FIGS. 5a and 5b, with the only difference that the second biasing member abuts braces against the housing and not against the actuator.

Figure 7:
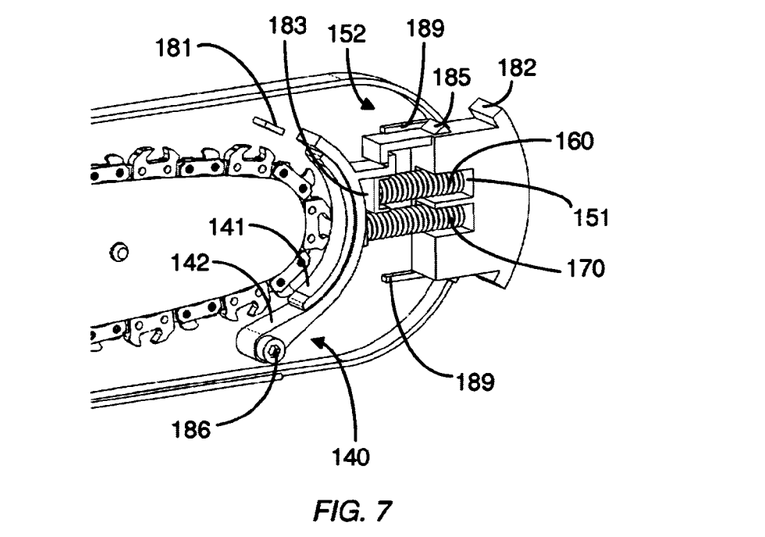
FIG. 7 is a perspective view of a portion of a chain sharpening device according to a sixth embodiment.
Figure 8:
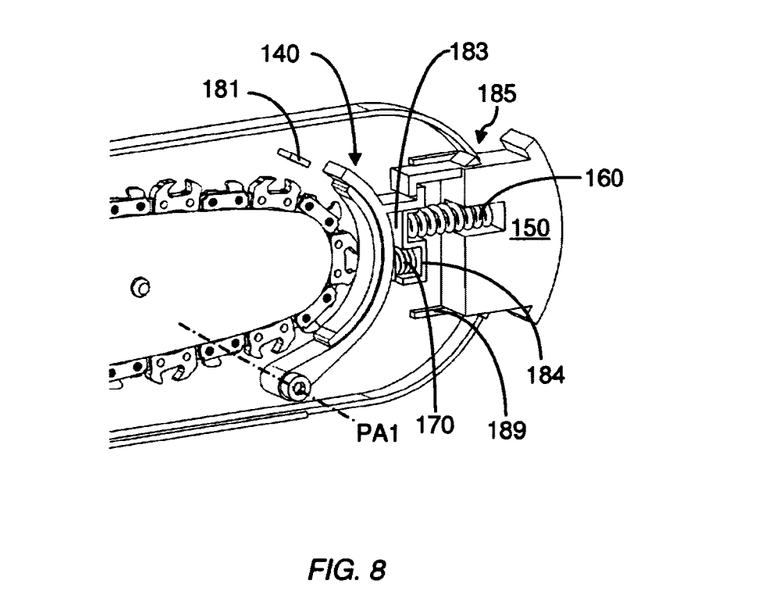
FIG. 8 is a perspective view of a portion of a chain sharpening device according to a seventh embodiment.

FIGS. 7 and 8

In the embodiments shown in FIGS. 7 and 8, the sharpening element is pivotably connected to the housing whereas the actuator is arranged so as to move linearly relative to the housing. In these embodiments, guides 189 can be present so as to guide the movement of the actuator between the activated state and the inactivated state.

According to these embodiments the stop 182 for limiting the movement of the actuator from the inactivated state to the activated state can be realized by means of a flange 182 of the actuator, which flange is arranged to abut on the front edges of the first and second half-shells of the housing.

A stop 185 arranged to delimit the movement of the actuator from the activated state to the inactivated state can be realized by means of a protruding portion 185 on the actuator, which protruding portion is arranged to engage with a front edge of the housing when the actuator is in its inactivated state. In FIGS. 7 and 8, the actuator is in its inactivated state, and the protruding portion 185 engages with the front edge of the first half-shell.

According to the embodiments shown in FIGS. 7 and 8, the support arrangement 152 comprises a cooperating protrusions provided on the sharping element holder and the actuator.

The only difference between the embodiments shown in FIGS. 7 and 8 is that the second biasing member 170 braces against the actuator in the embodiment shown in FIG. 7 whereas the second biasing member braces against a boss 184 formed in the housing in the embodiment shown in FIG. 8.

Figure 9:
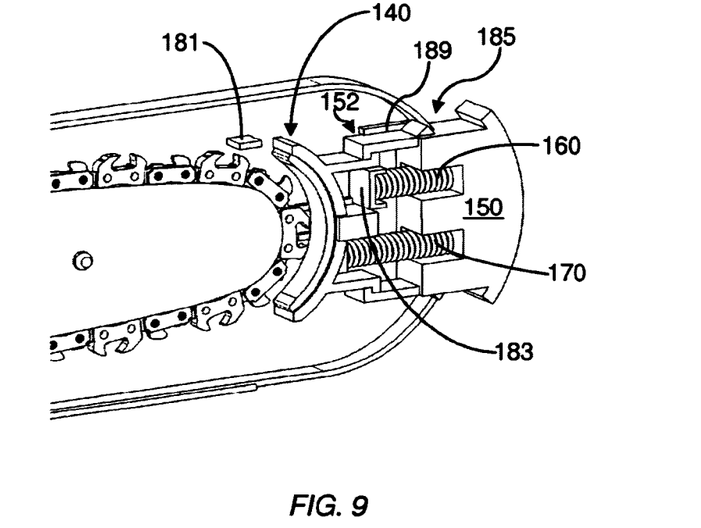
FIG. 9 is a perspective view of a portion of a chain sharpening device according to an eighth embodiment.
Figure 10:
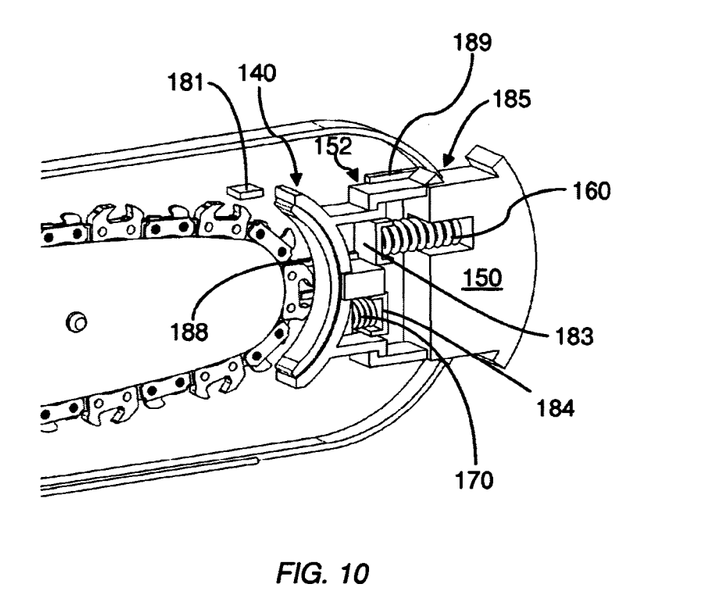
FIG. 10 is a perspective view of a portion of a chain sharpening device according to a ninth embodiment.

FIGS. 9 and 10

In the embodiments shown in FIGS. 9 and 10, the actuator as well as the sharpening element are configured for linear movement.

Chain Sharpening Operation

When an operator of a chain saw provided with a chain sharpening device according to embodiments herein needs to sharpen the saw chain, he or she attaches the chain sharpening device to the guide bar of the chain saw, with the chain arranged on the guide bar.

Then, he or she starts the chain saw and allows the chain to rotate at full speed about the guide bar. When the actuator of the chain sharpening device is pressed towards the ground or an object such as a log, the sharpening element will move to the activated state and the grinding portion will engage with the chain. In this way, a top surface of the links passing by the grinding portion as the chain rotates will become sharpened.

Grinding sparks might appear during chain sharpening. According to some embodiments herein, the housing is arranged to cover a major portion of the guide bar. Thereby, the grinding sparks are prevented from dispersing around the chain saw.

If the housing of the chain sharpening element is arranged to completely cover the portion of the guide bar which is exposed during normal use of the chain saw, the housing also prevents unintentional contact between the saw chain and objects around the chain saw during the sharpening operation.

A chain sharpening arrangement, in which the housing is arranged to completely cover the portion of the guide bar which is exposed during normal use of the chain saw, can be used instead of a separate guide bar protective cover.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A chain sharpening device arranged to sharpen a saw chain moving along a periphery of a guide bar of a chainsaw, the chain sharpening device comprising:
    a housing, arranged to be detachably mounted on the guide bar such that it encloses a portion of the guide bar and a portion of the saw chain,
    a sharpening element comprising a grinding portion, wherein the sharpening element is at least partially received within the housing, and wherein the sharpening element is selectively displaceable relative to the housing between a resting state and a sharpening state, such that, when the housing is mounted on the guide bar, around the periphery of which the chain is arranged, the grinding portion abuts on a portion of the saw chain in the sharpening state, and, the grinding portion is spaced away from the saw chain in the resting state,
    an actuator, selectively displaceable between an inactivated state and an activated state, wherein the actuator is connected to the sharpening element and arranged to selectively bring the sharpening element from the resting state to the sharpening state,
    a first biasing member operatively connected to the actuator and arranged to bias the actuator towards its inactivated state,
    wherein the chain sharpening device furthermore comprises a second biasing member, operatively connected to the sharpening element and arranged to enable relative movement between the actuator and the sharpening element when the sharpening element is in the sharpening state, so as to delimit a force with which the sharpening element can be pressed towards the saw chain.

2. A chain sharpening device according to claim 1, wherein the second biasing member is arranged to bias the sharpening element towards the activated state.

3. A chain sharpening device according to claim 1, wherein the sharpening device comprises a support arrangement preventing the sharpening element from moving towards the sharpening state as long as the actuator is not moving towards the activated state.

4. A chain sharpening device according to claim 1, wherein the sharpening element is pivotably connected to the housing so as to be rotatable about a first pivot axis.

5. A chain sharpening device according to claim 4, wherein the actuator is pivotably connected to the housing so as to be rotatable about a second pivot axis.

6. A chain sharpening device according to claim 5, wherein the first and second pivot axes are equal.

7. A chain sharpening device according to claim 1, wherein the actuator is arranged at an angle to a longitudinal direction of the housing.

8. A chain sharpening device according to claim 1, wherein a spring force of the first biasing member is greater than a spring force of the second biasing member.

9. A chain sharpening device according to claim 1, wherein the housing of the chain sharpening device covers the portion of the guide bar which is exposed during normal use of the chainsaw so that the housing functions as a guide bar protective cover.

10. A chain sharpening device arranged to sharpen a saw chain moving along a periphery of a guide bar of a chainsaw, the chain sharpening device comprising:
    a housing, arranged to be detachably mounted on the guide bar such that it encloses a nose portion of the guide bar and a portion of the saw chain,
    a sharpening element comprising a grinding portion, wherein the sharpening element is at least partially received within the housing, and wherein the sharpening element is selectively displaceable relative to the housing between a resting state and a sharpening state, such that, when the housing is mounted on the guide bar, around the periphery of which the chain is arranged, the grinding portion abuts on a portion of the saw chain that is adjacent the nose portion of the guide bar in the sharpening state, and, the grinding portion is spaced away from the saw chain in the resting state,
    an actuator, selectively displaceable between an inactivated state and an activated state, wherein the actuator is rigidly connected to the sharpening element and arranged to selectively bring the sharpening element from the resting state to the sharpening state, and
    a first biasing member operatively connected to the actuator and arranged to bias the actuator towards its inactivated state,
    wherein the actuator is pivotably connected to the housing so as to be rotatable about a pivot axis.

11. A chain sharpening device according to claim 10, wherein the housing is arranged to substantially cover the whole portion of the guide bar extending beyond a body portion of the chainsaw.

12. A chain sharpening device according to claim 10, which is so configured that the sharpening element engages the chain substantially at the nose portion of the guide bar.

13. A chain sharpening device according to claim 10 wherein the housing of the chain sharpening device covers the portion of the guide bar which is exposed during normal use of the chainsaw so that the housing functions as a guide bar protective cover.

14. A chainsaw being provided with a chain sharpening device arranged to sharpen a saw chain moving along a periphery of a guide bar of the chainsaw, the chain sharpening device comprising:
    a housing, arranged to be detachably mounted on the guide bar such that it encloses a portion of the guide bar and a portion of the saw chain,
    a sharpening element comprising a grinding portion, wherein the sharpening element is at least partially received within the housing, and wherein the sharpening element is selectively displaceable relative to the housing between a resting state and a sharpening state, such that, when the housing is mounted on the guide bar, around the periphery of which the chain is arranged, the grinding portion abuts on a portion of the saw chain in the sharpening state, and, the grinding portion is spaced away from the saw chain in the resting state, an actuator, selectively displaceable between an inactivated state and an activated state, wherein the actuator is connected to the sharpening element and arranged to selectively bring the sharpening element from the resting state to the sharpening state, a first biasing member operatively connected to the actuator and arranged to bias the actuator towards its inactivated state, wherein the chain sharpening device furthermore comprises a second biasing member, operatively connected to the sharpening element and arranged to enable relative movement between the actuator and the sharpening element when the sharpening element is in the sharpening state, so as to delimit a force with which the sharpening element can be pressed towards the saw chain.

* * * * *